United States Patent
Kerpez et al.

(10) Patent No.: US 9,780,956 B2
(45) Date of Patent: Oct. 3, 2017

(54) APPARATUS, SYSTEMS AND METHODS FOR DSM ENERGY MANAGEMENT

(76) Inventors: Kenneth Kerpez, Long Valley, NJ (US); Wonjong Rhee, Seoul (KR); Georgios Ginis, San Mateo, CA (US)

( * ) Notice: Subject to any disclaimer, the term of this patent is extended or adjusted under 35 U.S.C. 154(b) by 0 days.

(21) Appl. No.: 14/398,069

(22) PCT Filed: May 3, 2012

(86) PCT No.: PCT/US2012/036388
§ 371 (c)(1),
(2), (4) Date: Oct. 30, 2014

(87) PCT Pub. No.: WO2013/165429
PCT Pub. Date: Nov. 7, 2013

(65) Prior Publication Data
US 2015/0146767 A1    May 28, 2015

(51) Int. Cl.
*H04B 3/46* (2015.01)
*H04L 12/12* (2006.01)
(Continued)

(52) U.S. Cl.
CPC ............ *H04L 12/12* (2013.01); *H04B 3/32* (2013.01); *H04B 3/487* (2015.01); *H04L 1/0002* (2013.01);
(Continued)

(58) Field of Classification Search
CPC ........ H04B 3/32; H04B 3/487; H04B 1/1027; H04B 15/00; H04B 1/10; H04M 11/062;
(Continued)

(56) References Cited

U.S. PATENT DOCUMENTS

| 6,885,746 B2 * | 4/2005 | Hausman ................. H04B 3/23 370/201 |
| 2011/0150057 A1 | 6/2011 | Anschutz et al. |

FOREIGN PATENT DOCUMENTS

| WO | WO-2005057315 | 6/2005 |
| WO | WO-2010018562 | 2/2010 |

(Continued)

OTHER PUBLICATIONS

International Search Report and Written Opinion for International Patent Application No. PCT/US2012/036388, dated Jan. 28, 2013, 14 pages.

(Continued)

*Primary Examiner* — Rahel Guarino
(74) *Attorney, Agent, or Firm* — North Weber & Baugh LLP

(57) ABSTRACT

A method is provided which comprises: adjusting a plurality of times a transmit power to vary between a first setting and a second setting on a first Digital Subscriber Line (DSL line) to optimize energy consumption for the first DSL line; measuring or estimating a change in a performance of a second DSL line neighboring the first DSL line caused by a change in crosstalk on the second DSL line generated by the first DSL line in response to adjusting the transmit power of the first DSL line; and identifying one or more DSL lines among a plurality of DSL lines determined to safely operate in a low-power mode by identifying which of the plurality of DSL lines exhibit a crosstalk coupling to neighboring DSL lines below a specified threshold.

40 Claims, 12 Drawing Sheets

(51) Int. Cl.
*H04B 3/32* (2006.01)
*H04M 11/06* (2006.01)
*H04L 25/03* (2006.01)
*H04L 1/00* (2006.01)
*H04B 3/487* (2015.01)

(52) U.S. Cl.
CPC ..... *H04L 25/03828* (2013.01); *H04M 11/062* (2013.01); *Y02B 60/31* (2013.01)

(58) Field of Classification Search
CPC ...... H04M 3/306; H04M 3/302; H04M 3/304; H04M 3/34; H04M 1/24; H04M 3/301; H04M 3/18; H04M 3/30; H04M 3/007; H04M 3/22; H04M 1/74; H04L 12/66; H04L 5/1438; H04L 5/0007; H04L 12/12; H04L 5/006; H04L 1/0001; H04L 1/20; H04L 27/2614; H04L 5/0064; H04L 12/2602; Y02B 60/45; Y02B 60/31; Y02B 60/50; H04Q 2213/13166; H04Q 11/0435; H04Q 2213/13039; H04Q 2213/13092; H04Q 2213/1316; H04Q 3/0087; H04J 3/10
USPC ............... 375/222, 260, 220, 225, 227, 257; 370/201, 26, 494; 379/417, 1.04, 27.03, 379/399.01, 3, 406.01, 32.04, 93.07; 455/295, 501, 63.1, 67.11, 67.13
See application file for complete search history.

(56) References Cited

FOREIGN PATENT DOCUMENTS

WO    WO-2011077430    6/2011
WO    WO-2013064096    5/2013

OTHER PUBLICATIONS

International Search Report and Written Opinion for International Patent Application No. PCT/US2013/057672, dated May 28, 2014, 12 pages.

International Preliminary Report on Patentability for International Patent Application No. PCT/US2012/036388, dated Nov. 13, 2014, 9 pages.

Brown, "G.Fast: Updated Issues List for G.Fast", International Telecommunications Union; Geneva, Switzerland; Jul. 1-12, 2013; 52 pages.

Humphrey et al. "G.ADSL: Low Power Sub-States for use with ADSL2 (and ADSL2plus)", International Telecommunication Union; Bedford, Mass.; Jun. 20-24, 2011; 6 pages.

Humphrey, Les , "G.Fast: Low Power Modes—Continued", International Telecommunication Union; Red Bank, New Jersey; Mar. 18-22, 2013, 8 pages.

* cited by examiner

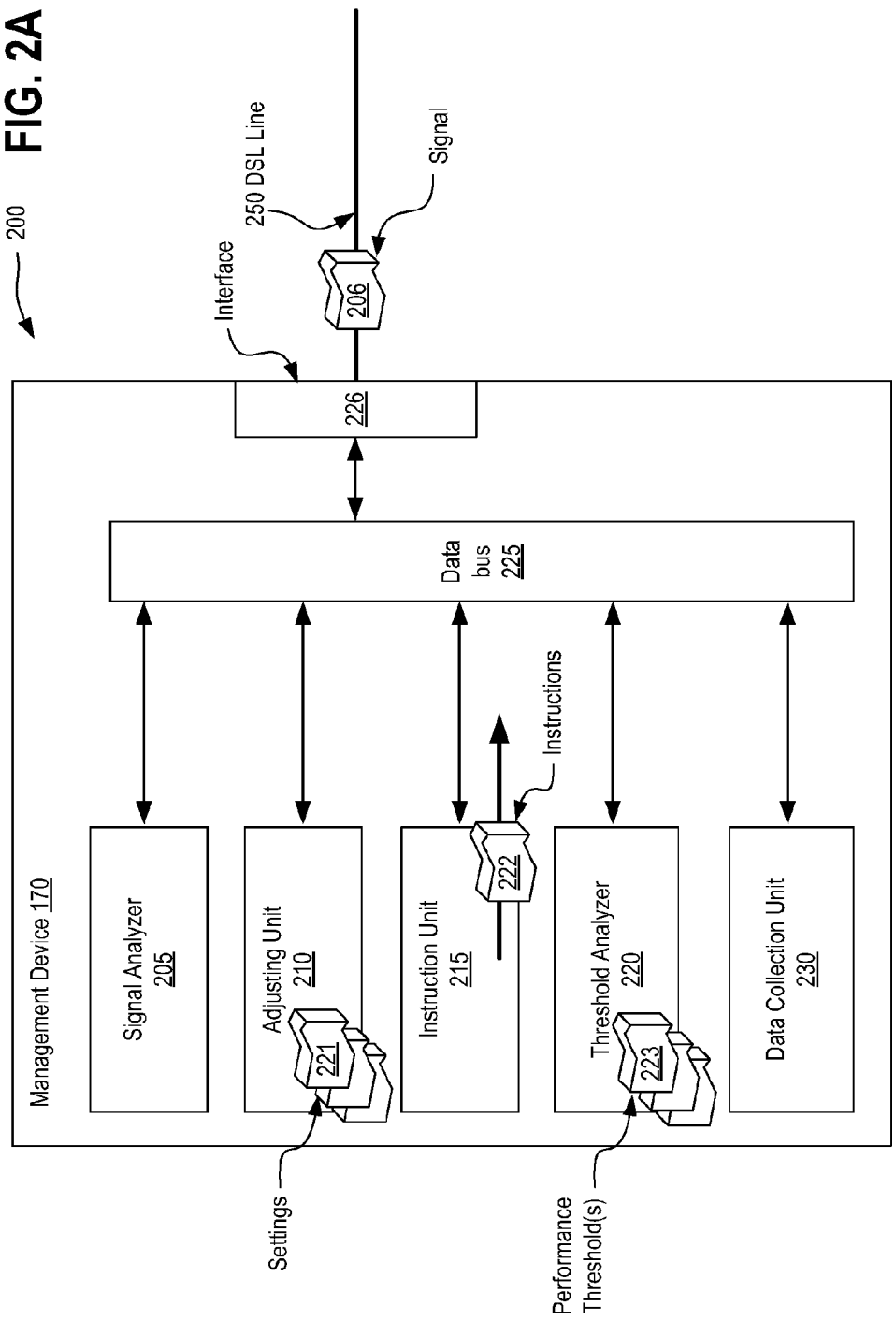

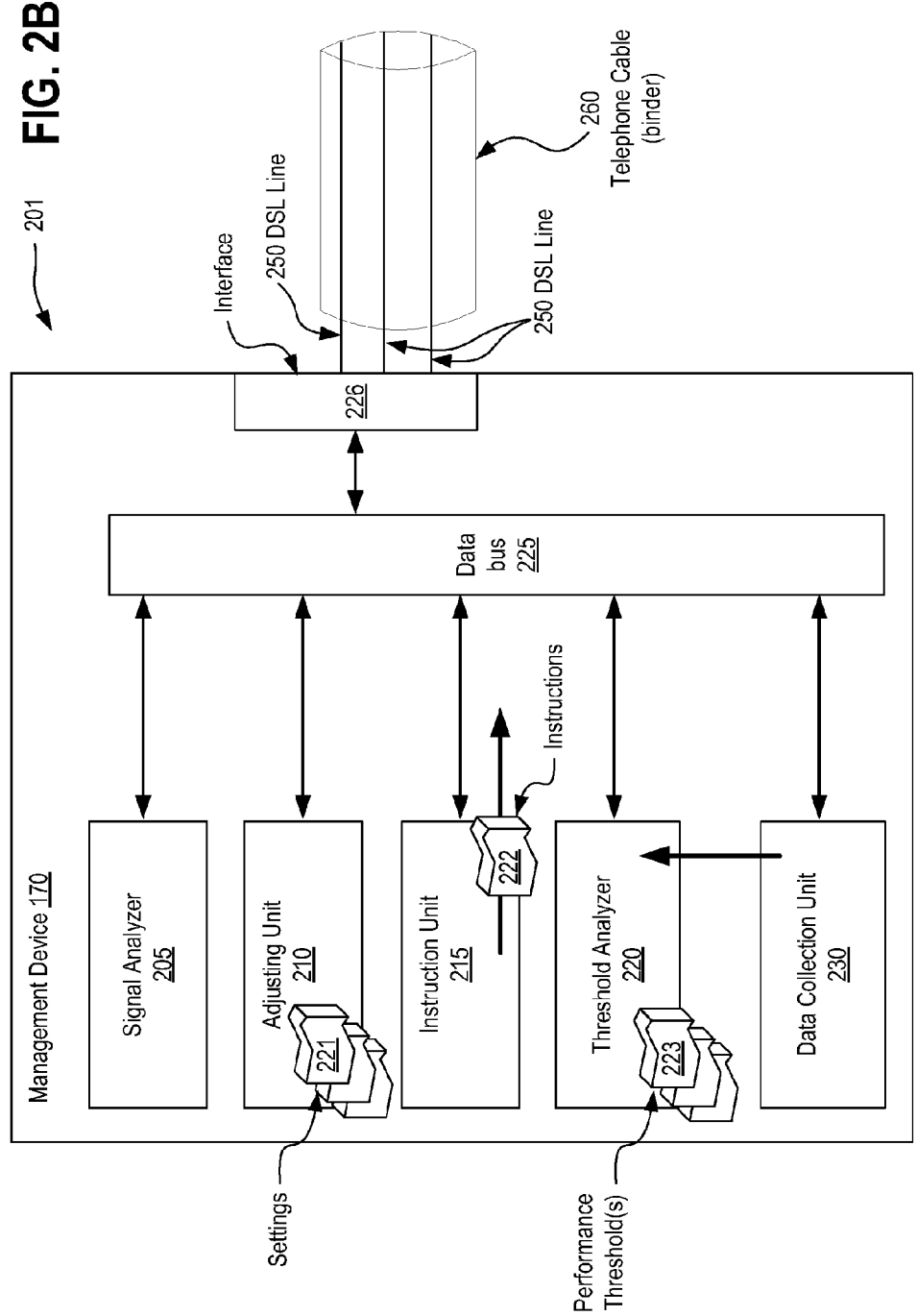

APPARATUS, SYSTEMS AND METHODS FOR DSM ENERGY MANAGEMENT

CLAIM OF PRIORITY

This application is a U.S. National Phase application under U.S.C. §371 of International Application No. PCT/US2012/036388, filed May 3, 2012, entitled "APPARATUS, SYSTEMS AND METHODS FOR DSM ENERGY MANAGEMENT", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to apparatuses, systems and methods for DSL energy management.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In the telecommunication arts, Digital Subscriber Lines (DSL lines) provide Internet connectivity to subscribers, including residential and business users.

Like all communication means, communicating signals over a DSL line requires energy. Conventional DSL communication mechanisms maintain transmission on all DSL lines at high power levels, at all times, because doing so is less complex and further because such a practice allows other DSL lines to adapt to a non-varying crosstalk from neighboring lines. For instance, where a consistent, high energy DSL transmission level is maintained, crosstalk affecting other DSL lines will be generally consistent as the DSL transmission power is maintained at a high level.

Notwithstanding the simplicity gained by operating DSL at consistently high transmission energies, such a practice is wasteful from an energy efficiency perspective.

The present state of the art may therefore benefit from apparatuses, systems, and methods for DSM energy management as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A illustrates an alternative exemplary architecture in accordance with which embodiments may operate;

FIG. 2B illustrates an alternative exemplary architecture in accordance with which embodiments may operate;

DETAILED DESCRIPTION

Figure 1:
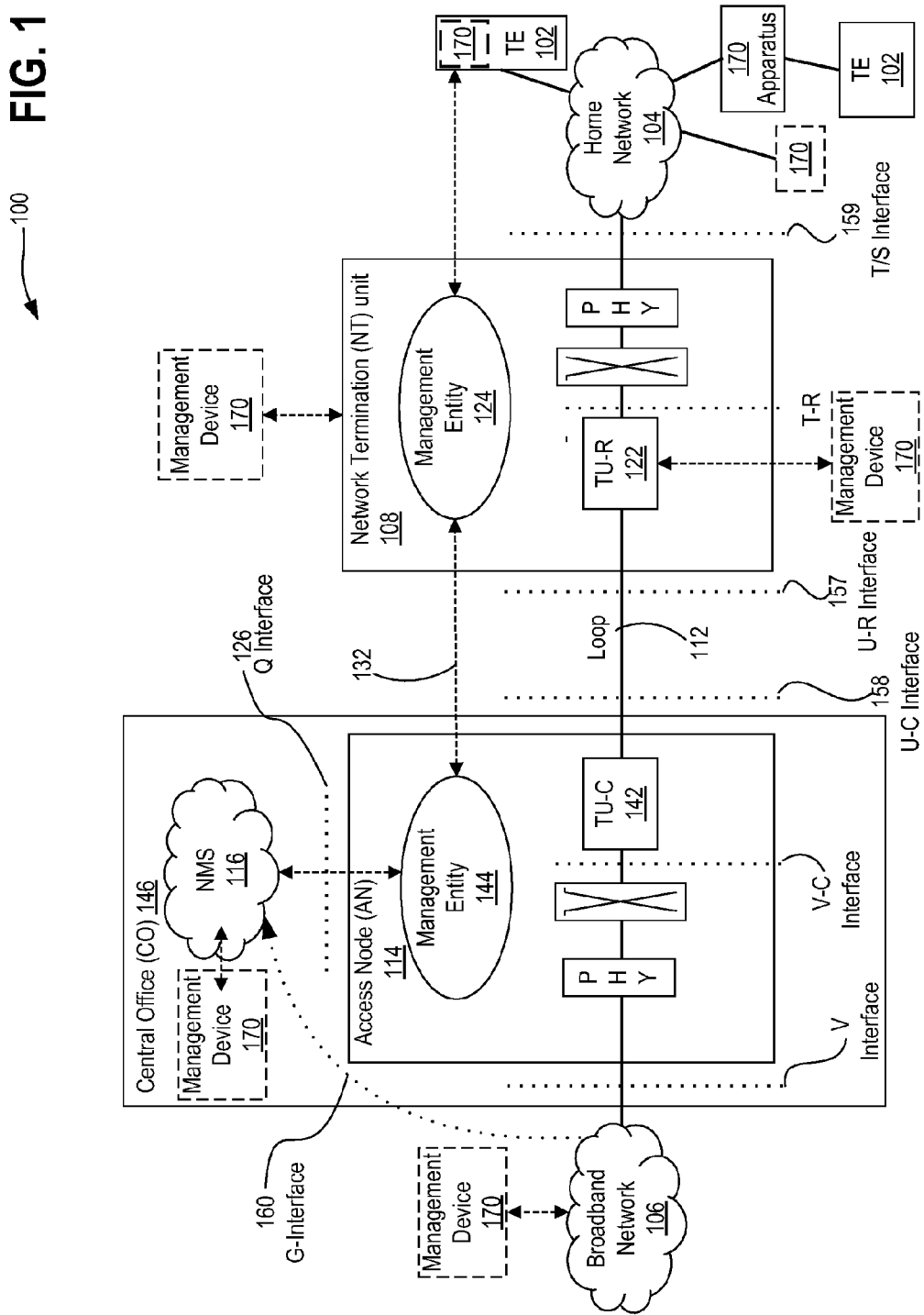
FIG. 1 illustrates an exemplary architecture in which embodiments may operate.

Described herein are apparatuses, systems, and methods for DSM energy management. In accordance with one embodiment, such means include: means for adjusting transmit power on a Digital Subscriber Line (DSL line) to optimize energy consumption for the DSL line; and means for changing settings for the DSL line responsive to adjusting the transmit power on the DSL line until performance of the DSL line at least meets a threshold performance. For example, the means for adjusting the transmit power may involve reducing the transmit power on the DSL line to reduce total transmission energy consumption of the DSL line in accordance with one embodiment. In other embodiments, transmit power is adjusted upwards, a transmit spectrum is adjusted, or effectiveness of such adjustments are measured. The transmit adjustments related to power and energy consumption can be performed slowly off-line, or rapidly in real-time to account for time-varying conditions. "Measurement" may be performed by querying network elements or management systems for data.

Conventional operation of DSL lines sometimes utilizes high power and high margin levels for no good reason besides simplicity of implementation. However, DSL profile optimization can be configured for power management, for example, by lowering transmit power to limit excess margin when possible in accordance with acceptable performance targets and thresholds. Experimental data has revealed that significant power savings are achievable on some newer types of Digital Subscriber Line Access Multiplexers (DSLAMs) and modems, and lesser but nevertheless worthwhile power savings are achievable on some older DSLAMs and modems.

The described embodiments set forth new techniques for managing a DSL line for energy saving yields which ensuring that service levels of the DSL line being managed as well as other DSL lines are minimally impacted. For instance, energy savings may be realized on the DSL line being managed while avoiding detrimental affects on neighboring DSL lines which may be affected by transmission energy level changes on the DSL line being managed, due to, for example, crosstalk cancellation in effect for such neighboring DSL lines.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.2 Very-high-speed Digital Subscriber Line or Very-high-bitrate Digital Subscriber Line (VDSL2) standard, the G.993.5 vectoring standard, the, G.998.4 INP standard, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN).

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote), 122 (for example, a transceiver defined by one of the ADSL or VDSL standards) or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices. XML or "eXtended Markup Language" compliant programming and interface tools may also be used.

In one embodiment, Network Termination Unit 108 is communicably interfaced with a management device 170 as described herein. In another embodiment, xTU-R 122 is communicably interfaced with management device 170.

Each xTU-R 122 in a system may be coupled with an xTU-C (xTU Central) in a Central Office (CO) or other central location. The xTU-C 142 is located at an Access Node (AN) 114 in Central Office 146. A Management Entity (ME) 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which may carry other communication services besides DSL based communications. Either Management Entity 124 or Management Entity 144 may implement and incorporate a management device 170 as described herein.

Apparatus 170 may be managed or operated by a service provider of the DSL services or may be operated by a third party, separate from the entity which provides DSL services to end-users. Thus, in accordance with one embodiment apparatus 170 is operated and managed by an entity which is separate and distinct from a telecommunications operator responsible for a plurality of digital communication lines. Management Entity 124 or Management Entity 144 may further store information collected from apparatus 170 within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in ME 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124. Additionally depicted is G-interface 160 between NMS 116 and broadband network 160.

At the U-interface (also referred to as loop 112), there are two management interfaces, one at xTU-C 142 (the U-C interface 158) and one at xTU-R 122 (the U-R interface 157). The U-C interface 158 provides xTU-C near-end parameters for xTU-R 122 to retrieve over the U-interface/loop 112. Similarly, the U-R interface 157 provides xTU-C near-end parameters for xTU-C 142 to retrieve over the U-interface/loop 112. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is management device 170 operating at various optional locations in accordance with several alternative embodiments. For example, management device 170 is located within home network 104, such as within a LAN. In an alternative embodiment, management device 170 is located at central office 146 and interfaced to home network 104 (e.g., a LAN) and broadband network 106 (e.g., DSL) via NMS 116. In yet another embodiment, management device 170 operates on the broadband network 106 (e.g., on the DSL). In one embodiment apparatus 170 operates as a DSL modem, such as a Customer Premises (CPE) modem. In another embodiment, apparatus 170 operates as a controller card or as a chipset within a user's terminal equipment 102 (e.g., a Customer Premises Equipment (CPE) device or a remote terminal device, network node, LAN device, etc.) coupled to the home network 104 as depicted. In another embodiment, apparatus 170 operates as a separate and physically distinct stand alone unit which is connected between the user's terminal equipment 102 and a DSL line or loop. For example, apparatus 170 may operate as a stand-alone signal conditioning device. In yet another embodiment, apparatus 170 is connected with a NT unit 108 or with xTU-R 122 over the T/S interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission functionality, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2A illustrates an alternative exemplary architecture 200 in which embodiments may operate. FIG. 2A depicts a management device 170 which is communicably interfaced to a first end of a Digital Subscriber Line (DSL line) 250, for example, through an interface 226 of the management device 170. Management device 170 includes several components which are interconnected through a data bus 225, including signal analyzer 205 to receive and analyze a signal from the DSL line 250, an adjusting unit 210 to introduce appropriate adjustments and optimizations to operation of the DSL line 250 utilizing, for example, changed settings 221, an instruction unit 215 to generate and issue instructions to a DSL line or its controlling mechanisms (e.g., a modem including a Customer Premises Equipment (CPE) modem or Central Office (CO) modem, a signal conditioning device, a controller which has operational control of a DSL line 250, etc.). In one embodiment the management device 170 further includes a threshold analyzer 220 capable to compare and evaluate performance of the DSL line 250 against one or more performance thresholds 223. The threshold analyzer 220 may perform analysis based on information collected and measured by the data collection unit 230 which operates to collect, measure, determine, and estimate relevant performance information representative of operational conditions and performance of the DSL line 250.

Thus, in accordance with one embodiment, a management device 170 includes an adjusting unit 210 to adjust transmit power on a DSL line 250 to optimize energy consumption for the DSL line 250 and further includes an instruction unit 215 to issue instructions 222 to change settings 221 for the DSL line 250 responsive to the adjusting unit 210 adjusting the transmit power on the DSL line 250. In such an embodiment, the instruction unit 215 continues issuing instructions 222 to change the settings 221 for the DSL line 250 until a threshold analyzer 220 determines that performance of the DSL line 250 at least meets a performance threshold 223. In accordance with one embodiment, a management 170 device adjusts the transmit power on the DSL line while simultaneously monitoring performance of the DSL line. Thus, such a management device 170 may receive real-time feedback responsive to the adjustments to transmit power.

In one embodiment, the management device 170 further includes a signal analyzer 205 to receive a signal 206 from the DSL line 250 for analysis, in which the signal analyzer 205 provides characteristics of the signal 206 from the DSL line 250 to the adjusting unit 210 based on the analysis.

In an alternative embodiment, the adjusting unit 210 adjusts a transmit spectrum on a DSL line 250 to optimize energy consumption for the DSL line 250.

In yet another embodiment, the adjusting unit 210 adjusts a transmit power multiple times between a first setting 221 and a second setting 221 to optimize energy consumption on a DSL line 250.

The instruction unit 215 may operate in conjunction with the adjusting unit 210 to issue appropriate instructions to implement the adjustments to the settings 221 onto the DSL line 250.

The adjusting unit 210 and instruction unit 215 may further adjust settings 221 and issue corresponding instructions 222 for multiple such DSL lines 250 depending on the configuration of the management device 170, its location as to the multiple DSL lines 250, and its interface 226 to them.

In accordance with one embodiment, the signal analyzer 205 is to further measure a change in a performance of a neighboring DSL line to DSL line 250 in which the change in performance is caused by a change in crosstalk into the neighboring DSL line generated from the first DSL line 250, in which the change correlates to the adjusting unit 210 adjusting transmit power of the first DSL line 250.

FIG. 2B illustrates an alternative exemplary architecture 201 in which embodiments may operate. Similar to FIG. 2A, the embodiment of FIG. 2B depicts also depicts a management device 170 having interface 226, data bus 225, signal analyzer 205, adjusting unit 210, settings 221, instruction unit 215, instructions 222, threshold analyzer 220, and one or more performance thresholds 223. In one embodiment, interface 226 is a Digital Subscriber Line Access Multiplexer (DSLAM). In another embodiment, interface 226 is an Access Node (AN).

Additionally shown is telephone cable (binder) 260 having multiple DSL lines 250 therein, each of which are connected with interface 226. In such an embodiment, management device 170 is configured to analyze signals from the multiple DSL lines and manage the multiple DSL lines 250 of the telephone cable or binder 260 by implementing appropriate adjustments to settings 221 via adjusting unit 210, issuing instructions 222 as necessary, and comparing measurements from the multiple DSL lines 250 against one or more performance thresholds 223 via threshold analyzer 220.

Figure 3:
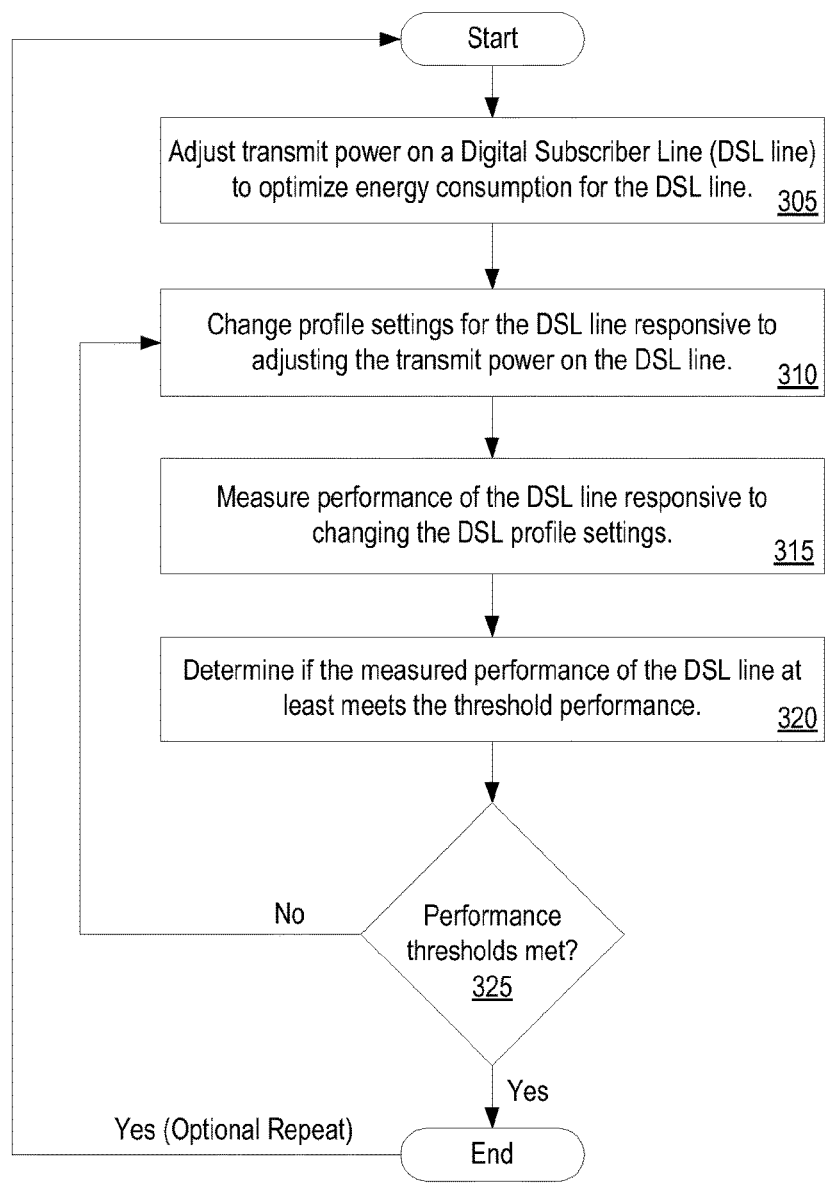
FIG. 3 illustrates a flow diagram for a method of energy management in accordance with described embodiments.

FIG. 3 illustrates a flow diagram 300 for a method of energy management in accordance with described embodiments.

Each of the following methods as represented by the following flow diagrams may be performed by processing logic that may include hardware (e.g., circuitry, dedicated logic, programmable logic, microcode, etc.), software (e.g., instructions run on a processing device to perform various operations such as interfacing, receiving, collecting, analyzing, adjusting, generating, monitoring, or some combination thereof). In one embodiment, the following methods are performed or coordinated via management device such as that depicted at element 170 of FIG. 1 and described throughout. Some of the blocks and/or operations listed as part of the following flow diagrams are optional in accordance with certain embodiments. The numbering of the blocks presented is for the sake of clarity and is not intended to prescribe an order of operations in which the various blocks must occur. Additionally, operations from the various flows diagrams provided may be utilized in a variety of combinations, including in combination with each other.

The method of flow diagram 300 may be used to manage transmit power and margin for a DSL line, referred to herein as "Level 1" Dynamic Spectrum Management (DSM) Energy management.

Level 1 techniques provide a means to lower the energy used by DSL lines while ensuring DSL performance. Many DSL lines transmit excessive power and are often underutilized. However, as noted above, conventional mechanisms ignore the excessive transmission energy levels so as to allow more simplistic operation and thus, such mechanisms maintain all DSL lines operating at the same power levels all the time.

Low-power modes such as "L2-mode" are defined for DSL lines, but such low-power modes are rarely invoked because service providers and DSL operators heretofore could not be assured of successful operation when using the low-power modes. Level 1 techniques as described by the method 300 therefore provide techniques for lowering DSL transmit power levels and means of placing DSL lines into low-power modes while also ensuring DSL service performance.

In accordance with one embodiment, adjustments to settings of a DSL line are measured and compared against one or more performance thresholds. For example, in accordance with one embodiment, for a DSL line to meet a performance threshold requires the adjusted DSL line to operate with a sufficiently low delay (e.g., latency is measured below a specified latency threshold) and with minimal energy usage as determined by transmit power being less than a specified threshold.

In accordance with one embodiment, a third parameter for determining optimization of a DSL line may be operational stability of the adjusted DSL line. For example, if the adjustments to the DSL line cause the line to exhibit erratic performance or high error rates, then its stability may be deemed insufficient, and thus, the measured performance of the adjusted DSL line cannot be said to be meeting a specified performance threshold. One means of determining stability of an adjusted DSL line is based on the number of retrains of the DSL line over a given period of time being lesser than a specified threshold. For example, threshold performance may be measured against a predetermined number of retrains for the DSL line over a given period of time. Another means of determining stability of an adjusted DSL line is similarly based on the number of code violations (CVs) or Loss of Margin (LOM), Errored Seconds (ES) other error counts. Yet another means of determining stability of an adjusted DSL line is similarly based on measurements of DSL performance such as Signal to Noise Ratio (SNR).

Because multiple DSL lines may actively transmit DSL signals within a single a telephone cable (or binder), each actively transmitting DSL line may generate and transmit crosstalk into neighboring lines within the same telephone cable or binder. When the transmit power on any one DSL line changes, the crosstalk from that DSL line into other DSL lines also changes commensurate with changes in transmit power energy levels of the first line. Such varying change in crosstalk emanating from a first line into others and crosstalk as received at neighboring lines may cause the neighboring lines to become unstable, potentially resulting in errors or retrain events.

Thus, in accordance with one embodiment, a trade-off exists between each of: (a) energy usage, (b) delay (e.g., latency), and (c) operational stability of a DSL line. Generally speaking, improving one of the three parameters causes at least one of the other two parameters to degrade, although such degradation may be imperceptible in many cases. Method 300 therefore manages multiple DSL lines to provide the desired trade-offs between the three parameters: energy usage, delay, and operational stability.

In accordance with one embodiment, power can be decreased while maintaining and improving bit rates and operational stability when profile optimization manages and re-profiles all the lines in a telephone cable or binder, or at least a plurality of such lines (such as the multiple DSL lines 250 depicted at FIG. 2B within telephone cable 260).

It is not effective to lower margins arbitrarily. So as to ensure stable service delivery as the power levels are dropped, DSL line profile settings need to be re-optimized and the performance of the DSL lines needs to be measured and verified, for example, by comparing measured attributes against one or more performance thresholds as described above.

Thus, in accordance with one embodiment, method 300 begins with processing logic for adjusting transmit power on a Digital Subscriber Line (DSL line) to optimize energy consumption for the DSL line at block 305.

At block 310, processing logic changes profile settings for the DSL line responsive to adjusting the transmit power on the DSL line.

At block 315, processing logic measures performance of the DSL line responsive to changing the DSL profile settings. For instance, an implementing means such as a management device may query Network Elements (NEs), Element Management Systems (EMS), Network Management Systems (NMS), or test devices to obtain performance data representative of the DSL line.

At block 320, processing logic determines if the measured performance of the DSL line at least meets the threshold performance.

At decision point 325, the method determines whether or not one or more performance thresholds have been met. If operational stability or performance are not sufficient based on performance thresholds, then operational flow returns to block 310 for changing profile settings. If the DSL line exhibits sufficient performance and operational stability in accordance with the performance thresholds, then flow may either end, or may optionally return to block 305 for another iteration of the method, beginning with adjusting the transmit power of the DSL line, for example, in search of potentially further energy consumption optimization. If the DSL line is measured and fails to meet the one or more performance thresholds, then the method may increase transmit power at block 305 and proceed to block 310 to change the profile settings for the DSL line responsive to the adjustment (e.g., the increase) of the transmit power for the DSL line so as to achieve acceptable performance characteristics against the specified thresholds. Alternatively, the method 300 may revert to a previously used power level that was measured with acceptable performance.

In accordance with one embodiment, adjusting the transmit power on the DSL line to optimize the energy consumption for the DSL line includes reducing the transmit power on the DSL line to reduce total transmission energy consumption of the DSL line. It is not always feasible to reduce the total transmission energy on some of the lines when managing multiple DSL lines, however, the technique may be applied to at least a portion or subset of a plurality of lines in a telephone cable or DSL binder such as element 260 depicted at FIG. 2B.

In accordance with one embodiment, the transmit power of the DSL line is adjusted by increasing the transmit power and the profile settings are changed responsive to increasing the transmit power on the DSL line until performance of the DSL line at least meets a threshold performance. For example, such an increase may be required for some lines so as to accommodate a decrease or reduction in transmit power levels on other DSL lines. Also, an increase may be required where a downward adjusted line fails to meet specified performance thresholds and thus requires a subsequent increase.

In accordance with one embodiment, measuring performance of the DSL line includes measuring one or more of the following from operation of the DSL line: data rate data; Signal-to-Noise Ratio ("SNR") margin data; maximum attainable data rate data; aggregate transmitted power data; code violation count data; forward error corrections data; errored seconds data; severely errored seconds data; loss of signal data, loss of margin data, errored frame data, high bit error rate data, TPS-TC out-of-sync data, retrain counts data; channel attenuation data; noise power spectral density data; crosstalk coupling data; far-end crosstalk coupling data; and data pertaining to crosstalk between a first DSL modem pair coupled with the DSL line and a second DSL modem pair operating on a second DSL line neighboring the first DSL line.

In accordance with one embodiment, changing the settings includes changing one or more of the following profile settings corresponding to the DSL line: error correction; interleaving; Unit Range Granularity; Power Management State Forced (PMSF); Power Management State Enabling (PMMode); L3 state (Idle state) Bit; L1/L2 state (Low power state) bit; Minimum L0 time interval between L2 exit and next L2 entry (L0-TIME); Minimum L2 time interval between L2 entry and first L2 trim (L2-TIME); Maximum aggregate transmit power reduction per L2 request or L2 power trim (L2 ATPR); Total maximum aggregate transmit power reduction in L2 (L2-ATPRT); transmit bit rate; net data rate; a Maximum Nominal Power Spectral Density ("MAXNOMPSD"); a Maximum Nominal Aggregate Transmitted Power ("MAXNOMATP"); a Gain ("gi"); a Bit-loading ("bi"); a Power-Cut-Back ("PCB"); a Maximum Received Power ("MAXRXPWR"); a Power Spectral Density Mask ("PSDMASK"); a Preferred Band ("PREF-BAND"); a Target Signal-to-Noise Ratio Margin ("TARSNRM"); a Minimum Signal-to-Noise Ratio Margin ("MINSNRM"); a Maximum Signal-to-Noise Ratio Margin ("MAXSNRM"); a frequency-dependent Bit-Cap ("BCAP"); a frequency-dependent Target Signal-to-Noise Ratio Margin ("TSNRM"); a Transmit Spectrum Shaping ("TSSi"); a specification of bands affected by radio frequency interference; a Carrier Mask ("CARMASK"); a per band preference band indication; a per tone bit cap; a per tone TARSNRM; a minimum data rate; a maximum data rate; a retransmission parameter setting; and a vectoring parameter setting.

In accordance with one embodiment, there is a non-transitory computer readable storage medium having instructions stored thereon that, when executed by a processor of an apparatus, the instructions cause the apparatus to perform operations comprising: adjusting transmit power on a Digital Subscriber Line (DSL line) to optimize energy consumption for the DSL line; and changing settings for the DSL line responsive to adjusting the transmit power on the DSL line until performance of the DSL line at least meets a threshold performance.

Figure 4:
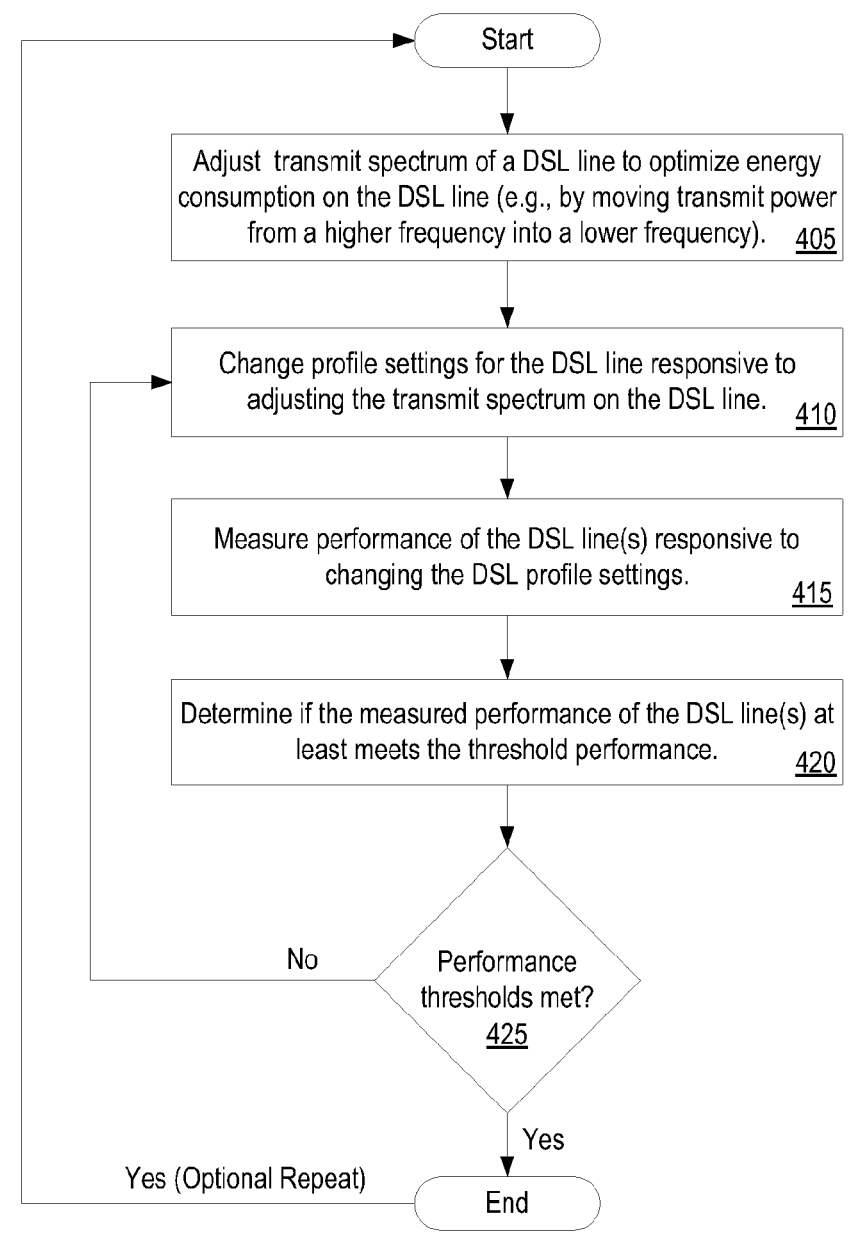
FIG. 4 illustrates an alternative flow diagram for a method of energy management in accordance with described embodiments.

FIG. 4 illustrates an alternative flow diagram for a method 400 of energy management in accordance with described embodiments.

The method of flow diagram 400 may be used to manage spectral optimization for a DSL line, referred to herein as "Level 2" DSM Energy management.

Level 2 techniques provide a means to save power by spectral optimization management. For example, DSL has less attenuation at lower frequencies and thus, a lower transmit power can be used at lower frequencies to attain the same received power as at higher frequencies. Accordingly, total transmit power may be lowered if a DSL line transmits more power at lower frequencies with low attenuation, and less power at high frequencies with high attenuation. However, such changes may conflict with algorithms that maximize DSM level 2 crosstalk performance.

For example, DSM Level 2 algorithm politeness sometimes causes a short line to use more total power because it uses higher frequencies in order to be "polite" to neighboring long lines. In such cases, politeness and power usage may be balanced and optimized to a particular environment. DSM level 2 energy management may therefore be configured to coordinate with DSM level 2 spectrum management for overall system optimization of bit rates for multiple DSL lines, for stability, and for total power usage and consumption.

For example, the Access Network Frequency Plan specifications [UK NICC Standard ND 1602 V5.1.1 (2011-09)] provides a DSM section which permits an upstream PSD-MASK (Power Spectral Density Mask) of a single line to be exceeded by 5 dB if the average PSD (Power Spectral Density) of all DSL lines is lowered by 2 dB. Such is an example of applicable regulatory flexibility which may be exploited to achieve network-wide power-savings using Level 2 DSM energy management.

Thus, in accordance with one embodiment, method 400 begins with processing logic for adjusting a transmit spectrum of a Digital Subscriber Line (DSL line) to optimize energy consumption on the DSL line at block 405, for example, by moving transmit power from a higher frequency into a lower frequency, since there is less attenuation at the lower frequency; such that total transmit power may be lowered. For example, to optimize energy consumption for the DSL line transmit power on the DSL line may be adjusted from a first frequency to a second frequency lower than the first frequency. Another means of optimizing energy consumption for the DSL line is to simultaneously allocate the usage of power at all frequencies with a transmit PSD or PSD mask in a power efficient allocation.

At block 410, processing logic changes profile settings for the DSL line responsive to adjusting the transmit spectrum on the DSL line.

At block 415, processing logic measures performance of the DSL line responsive to changing the DSL profile settings. For instance, an implementing means such as a management device may query performance data representative of the DSL line. For instance, a performance change of neighboring DSL lines may be measured to determine a change in crosstalk emanating from a first DSL line onto such neighboring DSL lines. If a first DSL line is creating excessive crosstalk into any other line, then the transmit spectra of the DSL line may be adjusted to minimize crosstalk into the affected lines neighboring the first. Thus, in accordance with one embodiment, the method changes the settings for the DSL line responsive to adjusting the transmit spectrum of the DSL line until performance of a second DSL line neighboring the first DSL line at least meets a second threshold performance while minimizing the power usage of the first DSL. In such an embodiment, a performance change of the second DSL line neighboring the first DSL line caused by a change in crosstalk received by the second DSL line generated by the first DSL line is measured responsive to adjusting the transmit spectra of the first DSL line.

At block 420, processing logic determines if the measured performance of the DSL line at least meets the threshold performance. Measurement of the second DSL line neighboring the first may also be compared against one or more performance thresholds.

At decision point 425, the method determines whether or not one or more performance thresholds have been met for the first DSL line and optionally for a second DSL line neighboring the first. If operational stability or performance are not sufficient based on performance thresholds, then operational flow returns to block 410 for changing profile settings. If the DSL line(s) exhibit sufficient performance and operational stability in accordance with the performance thresholds, then flow may either end, or may optionally return to block 405 for another iteration of the method 400.

In accordance with one embodiment, the method further discontinues or terminates the transmission of power on the DSL line at the first frequency, for example, where the second frequency at lower power is adopted and successfully passes performance thresholds.

In accordance with one embodiment, while keeping the transmit spectra invariant, the method 400 may change DSL profile settings (at block 410) and measure (at block 415) the performance and stability of the DSL line until acceptable stability and performance is achieved. The method operations 410 and 415 for changing and measuring may then be repeated for each of a plurality of lines (e.g., for a first DSL line, then a second DSL line neighboring the first, then a third DSL line, etc.). The method 400 may then be repeated until all DSL lines being managed reach an operating point with sufficient stability, performance, and low power usage in accordance with one or more performance thresholds. The method 400 may be repeated periodically, or triggered by an alarm for low performance or excessive power usage on one or more lines.

In an alternative embodiment using variant transmit spectrum for a DSL line, transmission on some sub-carrier(s) is terminated to save power. For example, higher sub-carriers may be terminated when they are not needed for carrying data, such as during idle periods or periods corresponding to low transmission rates.

In accordance with one embodiment, there is a non-transitory computer readable storage medium having instructions stored thereon that, when executed by a processor of an apparatus, the instructions cause the apparatus to perform operations comprising: adjusting a transmit spectrum of a Digital Subscriber Line (DSL line) to optimize energy consumption on the DSL line; and changing settings for the DSL line responsive to adjusting the transmit spectrum on the DSL line until performance of the DSL line at least meets a threshold performance.

Figure 5:
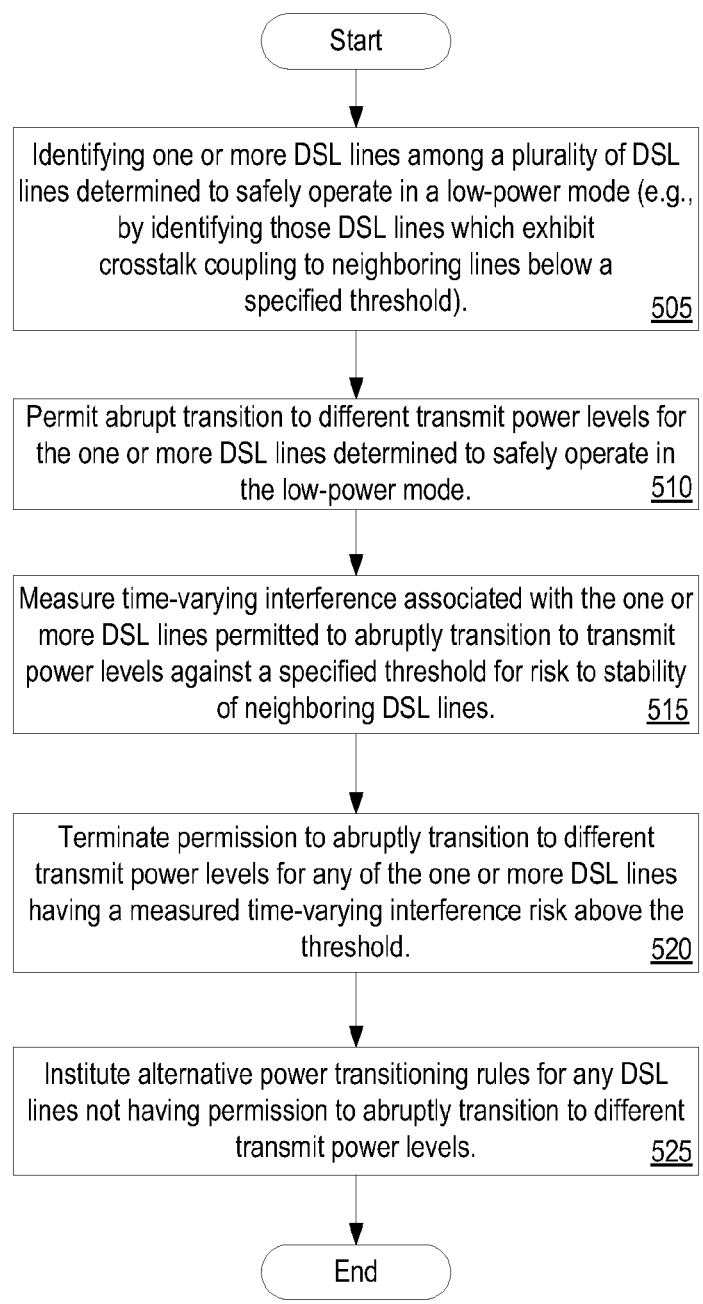
FIG. 5 illustrates an alternative flow diagram for a method of energy management in accordance with described embodiments.

FIG. 5 illustrates an alternative flow diagram for a method 500 of energy management in accordance with described embodiments.

The method of flow diagram 500 may be used for Time Domain management on a DSL line, referred to herein as "Level 3" DSM Energy management.

Level 3 techniques provide a means to place a DSL line into a low-power mode or state when the DSL line needs to transmit little or no traffic. DSL lines transmit idle codes when there is no user traffic, however, such idle codes are wasted energy as they are wholly unnecessary to fulfill user demand, which is effectively zero during idle periods.

The line may be completely turned off during times with no user demand, this is called "L3" state. The concept of turning off (L3) transmission at times when there is little or no traffic demand is problematic because no mechanism has conventionally existed by which to perform a fast initialization.

Instead of turning off the line completely, a DSL may temporarily go into a state of low power usage that still transmits a low data rate, this is called "L2" mode. L2 mode may be invoked when there is no traffic or low traffic, such as if there is only traffic from a voice connection which is typically a low bandwidth application. Although a power-off L3 approach would save more power than a low-power L2 mode, the requirement to perform a full retrain has proven so impractical that no known implementation of invoking L3 during idle times has been utilized in commercial deployment for paying subscribers. However, with an L2 low-power transmission mode, transmit power may be lowered by as much as 31 dB, and an L2 low-power mode may be exited nearly instantaneously, transitioning to full-power and full-speed operation without the need for a full retrain event.

Problematically, however, time-varying crosstalk (sometimes called non-stationary crosstalk) is exhibited when using low-power states resulting in instability for other lines affected by the power-mode changes and transmit power fluctuations on a given line. For example, when a first DSL line increases its power to transmit data, crosstalk into a nearby second DSL line increases correspondingly. Since the second DSL line did not start-up and perform initialization during the new crosstalk, the second DSL line is not well adapted to the new crosstalk (e.g., the time-variant crosstalk), thus causing the second DSL line to operate with a high error rate, and potentially causing or requiring a retrain event for the second DSL line so as to adapt to the new crosstalk without excessive error. Another change on the first DSL line, however, may once again result in detrimental operational conditions for the second DSL line.

Conventional techniques which discuss the possibility of entering a low-power mode fail to account for equipment cycling through such low-power (e.g., idle) and high-power (e.g., non-idle) transmit energy levels, and thus, conventional techniques fail to manage for such transitions, and are therefore prone to the aforementioned stability problems which can result in interrupting retrain events. Partly because of this stability problem, low-power states are almost never utilized in current DSL deployments.

In accordance with one embodiment, method 500 coordinates DSL energy management over time such that a management device may control when DSL lines transition between power states and also whether or not a DSL line is permitted to transition between power states. Also controlled is the speed and periodicity at which DSL lines may enter and exit from different DSL power states.

In accordance with one embodiment, three distinct power states are managed, including: power state "L0" representing full-power operation, power state "L1" representing a low-power operational mode supporting low-rate data transmission, and power state "L3" representing a state in which nothing is transmitted. In other embodiments there are more power states such as multiple low-power "L2" sub-modes with different power levels supporting and corresponding to different traffic levels. Low-rate data transmission may be determined by a rate of transmission which falls within a specified range. Thus, in accordance with one embodiment, the power state L2 includes multiple L2 power states (e.g., sub-L2 states), each having a distinct power level, in which transitions occur between the power state L0, the power state L3, and one of the multiple power states (e.g., sub-L2 states). In this embodiment the L2 state comprises the collection of sub-L2 states.

Thus, in accordance with one embodiment, method 500 begins with processing logic for identifying one or more DSL lines among a plurality of DSL lines determined to safely operate in a low-power mode at block 505, for example, by identifying those DSL lines which exhibit crosstalk coupling to neighboring lines below a specified threshold, and thus, are unlikely to cause problems of stability for the neighboring lines.

At block 510, processing logic permits abrupt transition to different transmit power levels for the one or more DSL lines determined to safely operate in the low-power mode.

At block 515, processing logic measures time-varying interference associated with the one or more DSL lines permitted to abruptly transition to transmit power levels against a specified threshold for risk to stability of neighboring DSL lines.

At block 520, processing logic terminates permission to abruptly transition to different transmit power levels for any of the one or more DSL lines having a measured time-varying interference risk above the threshold. For instance, a specified threshold for risk to stability of neighboring DSL lines may be determined using a specified number of retrains determined to be acceptable in a given period of time for the neighboring DSL lines. Multiple thresholds may be established for different categories or levels of risk to the neighboring DSL lines.

At block 525, processing logic institutes alternative power transitioning rules for any DSL lines not having permission to abruptly transition to different transmit power levels. For example, a management device may instruct such DSL lines to never transition to low modes, but instead use DSM energy management level 1 and 2 methods discussed above. Alternatively, where DSL lines exhibit a measured time-varying interference risk above the threshold but below a second threshold, the management device may implement waiting periods for such DSL lines before for entering and exiting low-power modes. Such waiting periods are designed to mitigate time-varying interference risk onto other DSL lines to statistically controlled levels so as to avoid instability for such lines which could result in detrimental retrain events. Another alternative for the case where DSL lines exhibit a measured time-varying interference risk above the threshold but below a second threshold, is for the management device to increase the power level of the low-power state, thereby limiting the instability of other DSLs.

Thus, in accordance with one embodiment, method 500 adjusts a plurality of times a transmit power between a first setting and a second setting on a first DSL line to optimize energy consumption for the first DSL line and measures a change in a performance of a second DSL line neighboring the first DSL line caused by a change in crosstalk on the second DSL line generated by the first DSL line in response to adjusting the transmit power of the first DSL line.

In one embodiment, the method further categorizes a level of the change in the performance of the second DSL line neighboring the first DSL line caused by the change in crosstalk. For example, categories may include low risk, high risk, medium risk, etc. Based on the category, risk may be assessed against a threshold, and permission to change transmit power states or strategy for changing transmit power states may be established.

In accordance with one embodiment, the change in crosstalk is associated with time-varying crosstalk emanating from the first DSL line due to a transition to a different transmit power level for the first DSL line.

In one embodiment, the first DSL line is prevented from being further adjusted when the measured change in the performance of the second DSL line neighboring the first DSL line meets or exceeds a threshold and is allowed to be further adjusted when the measured change in the performance of the second DSL line neighboring the first DSL line does not meet or exceed the threshold.

In an alternative embodiment the method predicts a further change in the performance of the second DSL line neighboring the first DSL line from further adjusting the transmit power for the first DSL line, in which the further change in the performance of the second DSL correlates to a further change in crosstalk on the second DSL line generated by the first DSL line in response to adjusting the transmit power of the first DSL line.

In accordance with one embodiment, there is a non-transitory computer readable storage medium having instructions stored thereon that, when executed by a processor of an apparatus, the instructions cause the apparatus to perform operations comprising: adjusting a plurality of times a transmit power, in which the transmit power may vary between a first setting and a second setting on a first Digital Subscriber Line (DSL line) to optimize energy consumption for the first DSL line; and measuring a change in a performance of a second DSL line neighboring the first DSL line caused by a change in crosstalk on the second DSL line generated by the first DSL line in response to adjusting the transmit power of the first DSL line.

Figure 6:
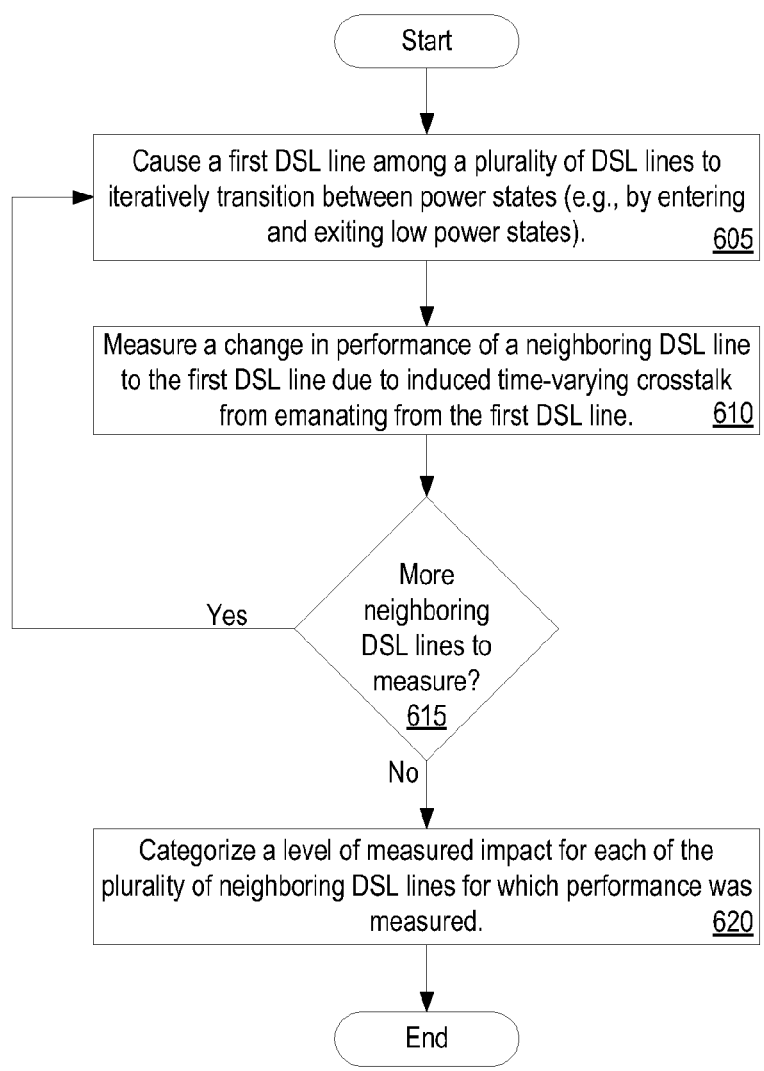
FIG. 6 illustrates an alternative flow diagram for a method of energy management in accordance with described embodiments.

FIG. 6 illustrates an alternative flow diagram for a method 600 of energy management in accordance with described embodiments.

The method of flow diagram 600 may be used for implementing adaptive energy management on a DSL line extending upon the above described "Level 3" DSM Energy management techniques.

Adaptive level 3 energy management techniques provide a means to determine an impact of allowing a first DSL line enter and exit low-power states.

For example, method 600 begins with processing logic for causing a first DSL line among a plurality of DSL lines to iteratively transition between power states at block 605 (e.g., by entering and exiting low-power states).

Processing logic at block 610 measures a change in performance of a neighboring DSL line to the first DSL line due to induced time-varying crosstalk emanating from the first DSL line. For example, where the first DSL line is permitted to enter and exit low-power states several times, DSL equipment communicably interfaced to second and third DSL lines may be queried to determine what affect or impact is caused to the second and third DSL lines (or any number of a plurality of DSL lines being managed) due to the induced time-varying crosstalk emanating from the first DSL line. For example, in one embodiment, a change in performance of a second DSL line neighboring the first DSL line is measured in accordance with one of the second DSL line's: loss of margin, resynchronizations, error counts, and Seamless Rate Adaptation (SRA) to lower speeds. Alternatively, the change in performance may be estimated.

The process may be repeated iteratively for each of multiple DSL lines, thus, at decision block 615 it is determined whether additional neighboring DSL lines need to be measured. If yes, then flow returns to block 605 for another iteration. If no, then flow advances to block 620.

Processing logic at block 620 then categorizes a level of measured impact for each of the plurality of neighboring DSL lines for which performance was measured. For instance, impact to a neighboring line may be categorized as a high impact which may then correspond to a rule not to allow the DSL line to enter and exit low power states, or allow the DSL line to enter and exit low power states only infrequently, depending on a selected policy. Impact to a neighboring line may be categorized as a low impact which may then correspond to a rule to allow such non-impacting DSL lines to enter and exit low power states at will and to do so abruptly. Impact to a neighboring line may be categorized as a medium impact which may then correspond to a rule to select waiting periods for such a DSL line to enter and exit low power modes so as to statistically control the impact on other lines, or a rule to limit the power levels of the low-power states.

In one embodiment measuring a change in performance of a neighboring DSL line includes reading crosstalk data and calculating which of the plurality of DSL lines may cause excessive impact from time varying crosstalk using low-power states.

For example, in accordance with one embodiment, processing logic determines if the first DSL line or the second DSL line exhibits a time-varying interference risk above a threshold and responsively increases a power level of a low-power state to mitigate the time-varying interference risk onto other DSL lines and increase stability for the other DSL lines. Alternatively, where the opposite condition is present, processing logic determines if the first DSL line or the second DSL line exhibits a time-varying interference risk below a threshold and responsively decreases a power level of a low-power state to lower energy consumption while ensuring an acceptable interference risk onto other DSL lines.

In one embodiment the method further includes observing traffic patterns and making recommendations for the choice of low-power mode parameters. For instance, multiple lines may be managed with a gradual wake-up while allowing seamless rate adaptation (SRA) to lower some bit rates for lines impacted by time-varying crosstalk. Such a technique may be accomplished with adaptive re-profiling.

In one embodiment, power-down and wake-up is scheduled by time-of-day based on historical usage. Such a technique may be implemented by issuing management commands several times a day. Managed DSL modems are configured to react to user traffic demands with rapid wake-up. Wake-up may be session based, for example, triggering a wake-up event during an Internet Protocol television (IPTV) set-top session initiation or when a Voice over Internet Protocol (VoIP) device triggers an off hook event.

In accordance with one embodiment where a DSL line is determined to be nearly always off during certain times of the day or week, then the method further includes scheduling a transition to a low-power state for that DSL line near those times. Transitions to a higher-power data carrying state may additionally be scheduled before the line is expected to carry traffic again. In addition to a scheduled higher-power data carrying state, the DSL line may transition to a higher power state at any time when traffic is requested by the user.

In one embodiment, scheduled power transitions are disabled or re-scheduled when it is determined that such transitions on a first DSL line is categorized as having a high impact to neighboring DSL lines due to the induced time-vary crosstalk.

In one embodiment, one or more DSL lines neighboring a first DSL line are allowed to incur some detrimental impact and corresponding performance deterioration by lowering margin or lowering bit rate through SRA or other available mechanisms.

In one embodiment, a policy manager of a management device informs a DSL power management system that sessions are due to start or expire, and (re-)schedules power management state transitions accordingly.

In one embodiment, a management device is communicatively interfaced with a plurality of DSL lines participating within a vectored group, in which transitions to low-power modes are coordinated within the vectored group. In such an embodiment, time-varying crosstalk causes little or no impact because nearly all crosstalk is cancelled within the vectored group thus negating stability problems owing to time-variant crosstalk for members of the vectored group. However, nearby lines that are not participating in the vectored group may have stability problems caused from time-varying crosstalk emanating from lines participating within the vectored group, and such time-varying crosstalk may therefore be managed to ensure stability for the non-vectored lines.

In embodiments operating upon at least one group of vectored DSL lines, the method allows transitions to low-power states as traffic demands warrant, for all lines within a vectored group. Such an embodiment may further coordinate the transitions to and from low-power states with the crosstalk cancellation in the vectored group, so that lines transitioning to higher power states have their crosstalk effectively cancelled. Such a method may further include monitoring performance of nearby line(s) to the vectored group to determine the impact of the time varying crosstalk from within the vectored group.

In one embodiment, either or both of the following operations are performed: (a) performance (bit rate, margin, etc.) of the impacted non-vectored line(s) is limited to a level that can tolerate the time-varying crosstalk; and (b) a number or severity of power mode transitions is limited for those lines within the vectored group to mitigate impact of time varying crosstalk from lines participating in the vectored group into the non-vectored lines to a level below a specified threshold.

In accordance with one embodiment, transitions between different power states and power modes are implemented within transceivers of a DSL communication apparatus. In such embodiments, power state transitions are triggered when traffic or performance parameters become above or below a DSL Management Information Base (MIB) controlled threshold. In one embodiment, a management device determines what thresholds to set for each of a plurality of communicatively interfaced DSL lines and sets the thresholds via the DSL MIB without needing to keep up with the real-time traffic on each of the DSL lines.

In accordance with one embodiment, a management device further determines how power state transitions should occur, and determines what thresholds should be set for each of a plurality of DSL lines transitioning to different power states based on observed traffic patterns, measured performances, and power usage of the DSL lines. In such an embodiment, operation of the plurality of DSL lines transitioning to different power states is monitored and thresholds are reset as necessary by repeating operations of method 600.

Figure 7:
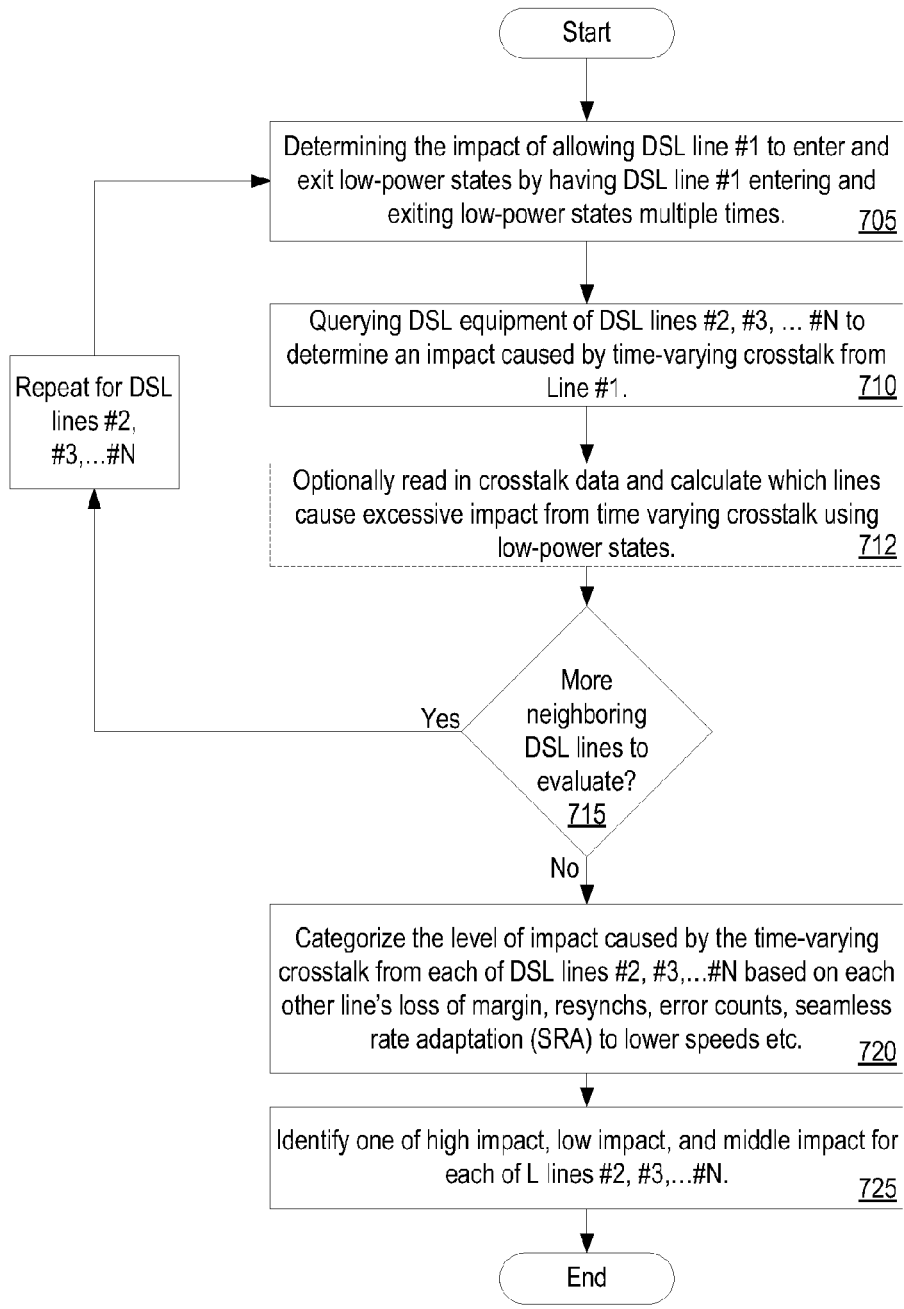
FIG. 7 illustrates an alternative flow diagram for a method of DSM level 3 energy management in accordance with described embodiments.

FIG. 7 illustrates an alternative flow diagram for a method 700 of DSM level 3 energy management in accordance with described embodiments.

Method 700 begins with processing logic for determining the impact of allowing DSL line #1 to enter and exit low-power states by having DSL line #1 entering and exiting low-power states multiple times at block 705.

Processing logic at block 710 queries DSL equipment of DSL lines #2, #3, . . . #N to determine an impact caused by time-varying crosstalk from Line #1.

Processing logic at block 712 optionally reads in crosstalk data and calculates which lines cause excessive impact from time varying crosstalk using low-power states.

The process may be repeated iteratively for each of multiple DSL lines #2, #3, . . . #N, thus, at decision block 715 it is determined whether additional neighboring DSL lines need to be evaluated. If yes, then flow returns to block 705 for another iteration. If no, then flow advances to block 720.

Processing logic at block 720 then categorizes the level of impact caused by the time-varying crosstalk from each of DSL lines #2, #3, . . . #N based on each other line's loss of margin, resynchs, error counts, seamless rate adaptation (SRA) to lower speeds etc.

Processing logic at block 725 then identifies one of high impact, low impact, and middle impact for each of L lines #2, #3, . . . #N. According to one embodiment, high impact policy is to not allow these lines to enter and exit low power states, or allow only infrequently; a low impact policy for evaluated lines is to allow these non-impacting DSL lines to enter and exit low power states at will; and a middle impact policy for evaluated lines is to intelligently select waiting periods for entering and exiting L2 mode to statistically control impact on other lines.

Figure 8:
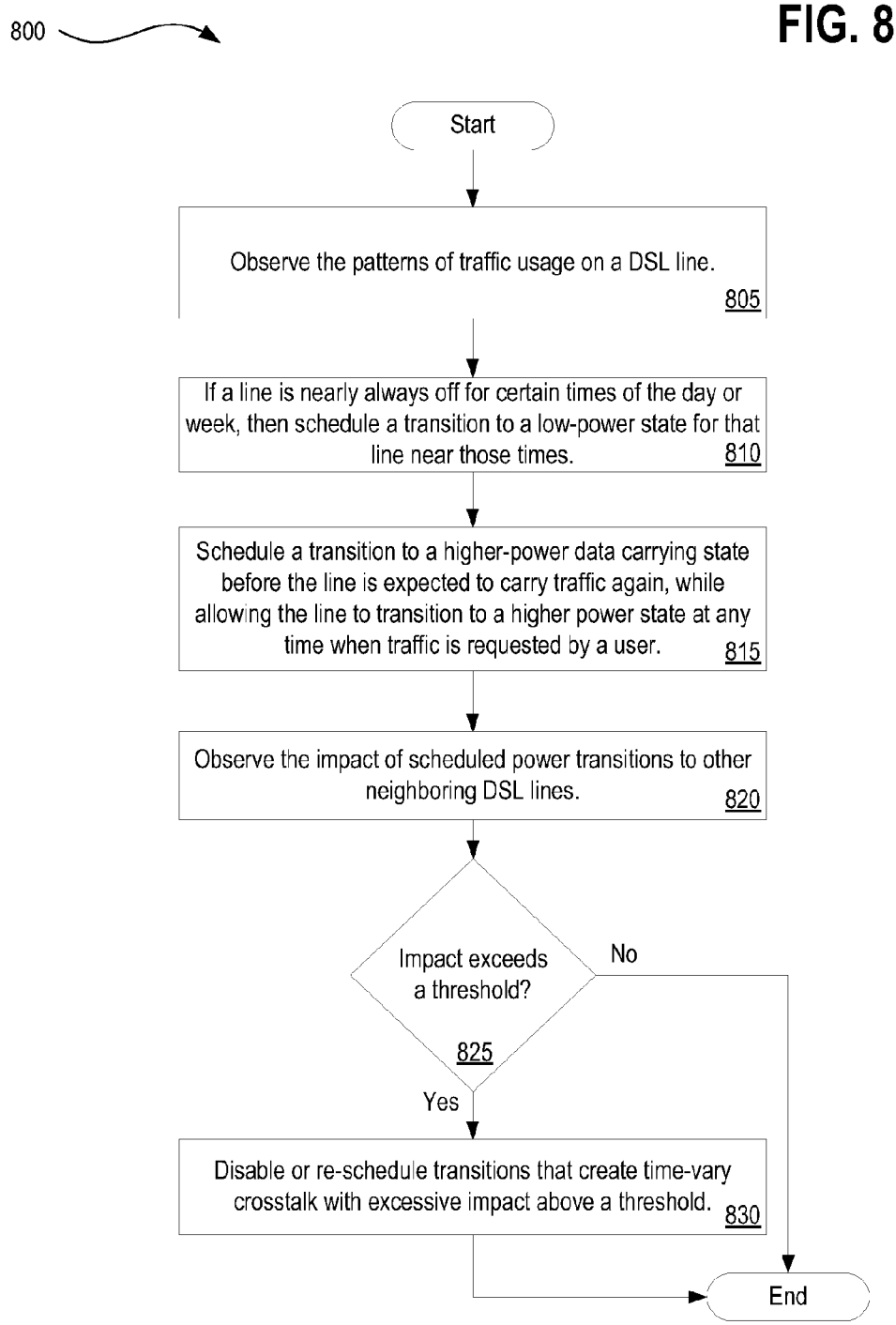
FIG. 8 illustrates an alternative flow diagram for a method of DSM level 3 energy management in accordance with described embodiments.

FIG. 8 illustrates an alternative flow diagram for a method 800 of DSM level 3 energy management in accordance with described embodiments.

Method 800 begins with processing logic for observing the patterns of traffic usage on a DSL line at block 805.

Processing logic at block 810 determines if a line is nearly always off for certain times of the day or week and then schedules a transition to a low-power state for that line near those times.

Processing logic at block 815 schedules a transition to a higher-power data carrying state before the line is expected to carry traffic again, while allowing the line to transition to a higher power state at any time when traffic is requested by a user.

Processing logic at block 820 observes the impact of scheduled power transitions to other neighboring DSL lines.

At decision block 825 it is determined whether an impact of the scheduled transitions exceeds a threshold. If no, then flow advances the end of method 800. If yes, then flow advances to block 830 where processing logic disables or re-schedules transitions that create time-vary crosstalk with excessive impact above the threshold.

Figure 9:
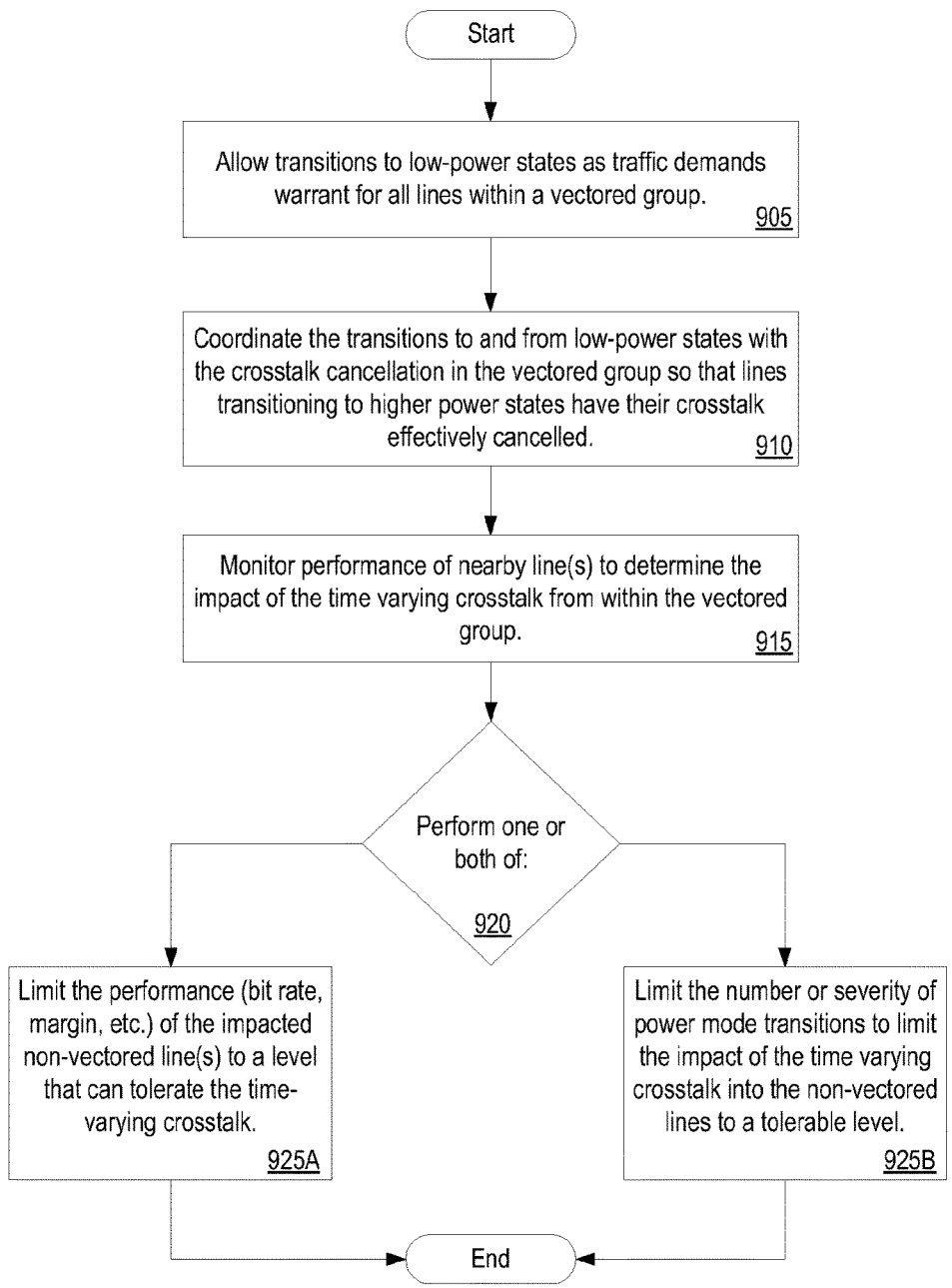
FIG. 9 illustrates an alternative flow diagram for a method of DSM level 3 energy management in accordance with described embodiments.

FIG. 9 illustrates an alternative flow diagram for a method 900 of DSM level 3 energy management in accordance with described embodiments.

Method 900 begins with processing logic to allow transitions to low-power states as traffic demands warrant for all lines within a vectored group at block 905.

Processing logic at block 910 coordinates the transitions to and from low-power states with the crosstalk cancellation in the vectored group so that lines transitioning to higher power states have their crosstalk effectively cancelled.

Processing logic at block 915 monitors performance of nearby line(s) to determine the impact of the time varying crosstalk from within the vectored group.

According to method 900, at decision point 920 either one or both of blocks 925A and 925B are performed in which processing logic at block 925A limits the performance (bit rate, margin, etc.) of the impacted non-vectored line(s) to a level that can tolerate the time-varying crosstalk and further in which processing logic at block 925B limits the number or severity of power mode transitions to limit the impact of the time varying crosstalk into the non-vectored lines to a tolerable level. Flow then proceeds to the end.

Figure 10:
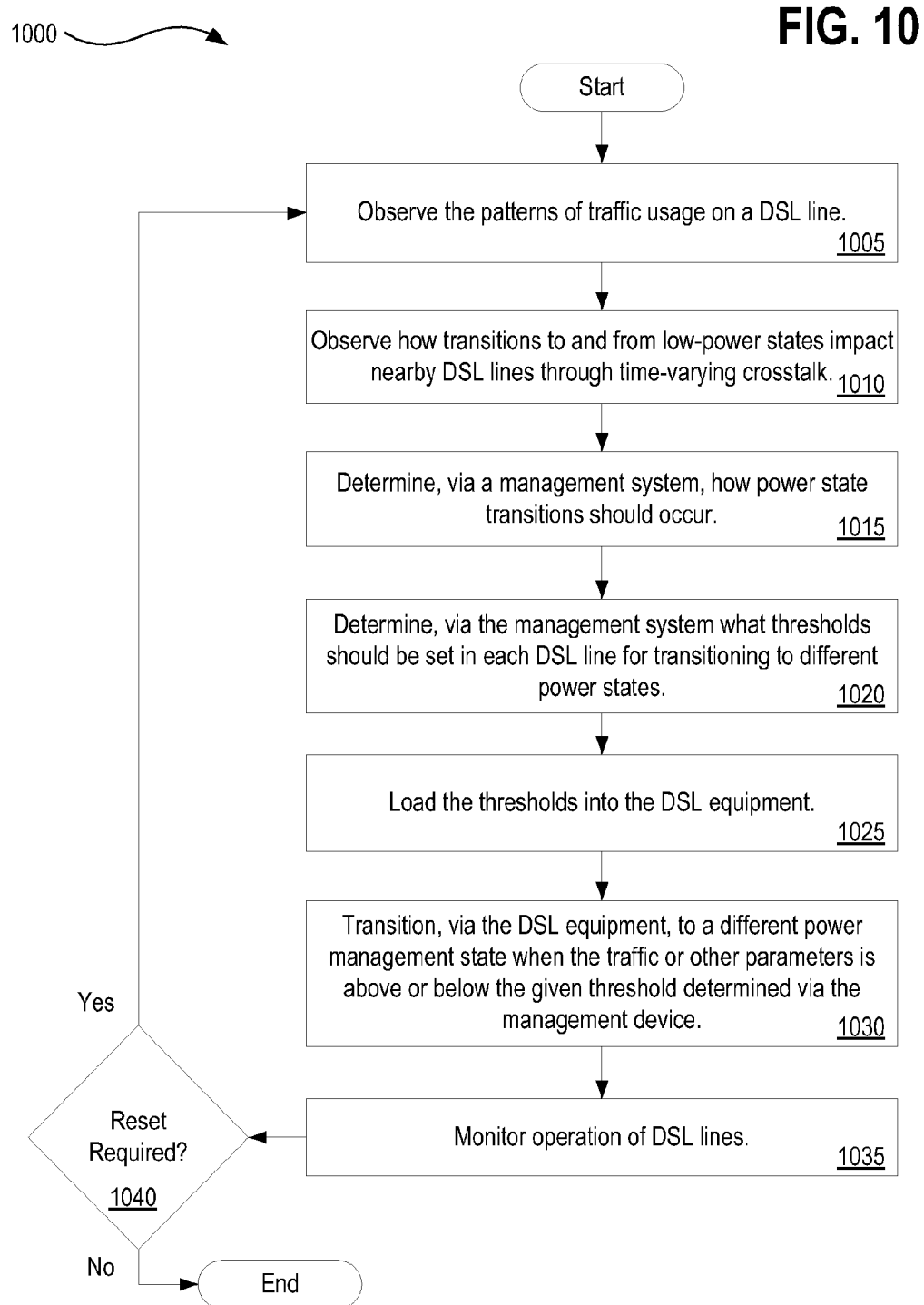
FIG. 10 illustrates an alternative flow diagram for a method of DSM level 3 energy management in accordance with described embodiments.

FIG. 10 illustrates an alternative flow diagram for a method 1000 of DSM level 3 energy management in accordance with described embodiments.

Method 1000 begins with processing logic to observe the patterns of traffic usage on a DSL line at block 1005.

Processing logic at block 1010 observes how transitions to and from low-power states impact nearby DSL lines through time-varying crosstalk.

Processing logic at block 1015 determines, via a management system, how power state transitions should occur.

Processing logic at block 1020 determines, via the management system what thresholds should be set in each DSL line for transitioning to different power states.

Processing logic at block 1025 loads the thresholds into the DSL equipment.

Processing logic at block 1030 transitions, via the DSL equipment, to a different power management state when the traffic or other parameters is above or below the given threshold determined via the management device.

Processing logic at block 1035 monitors operation of DSL lines.

According to method 1000, at decision point 1040 it is determined whether or not a reset is required. If no, then flow proceeds to end. If yes, then flow returns to block 1005 to repeat the method 1000 as necessary.

Figure 11:
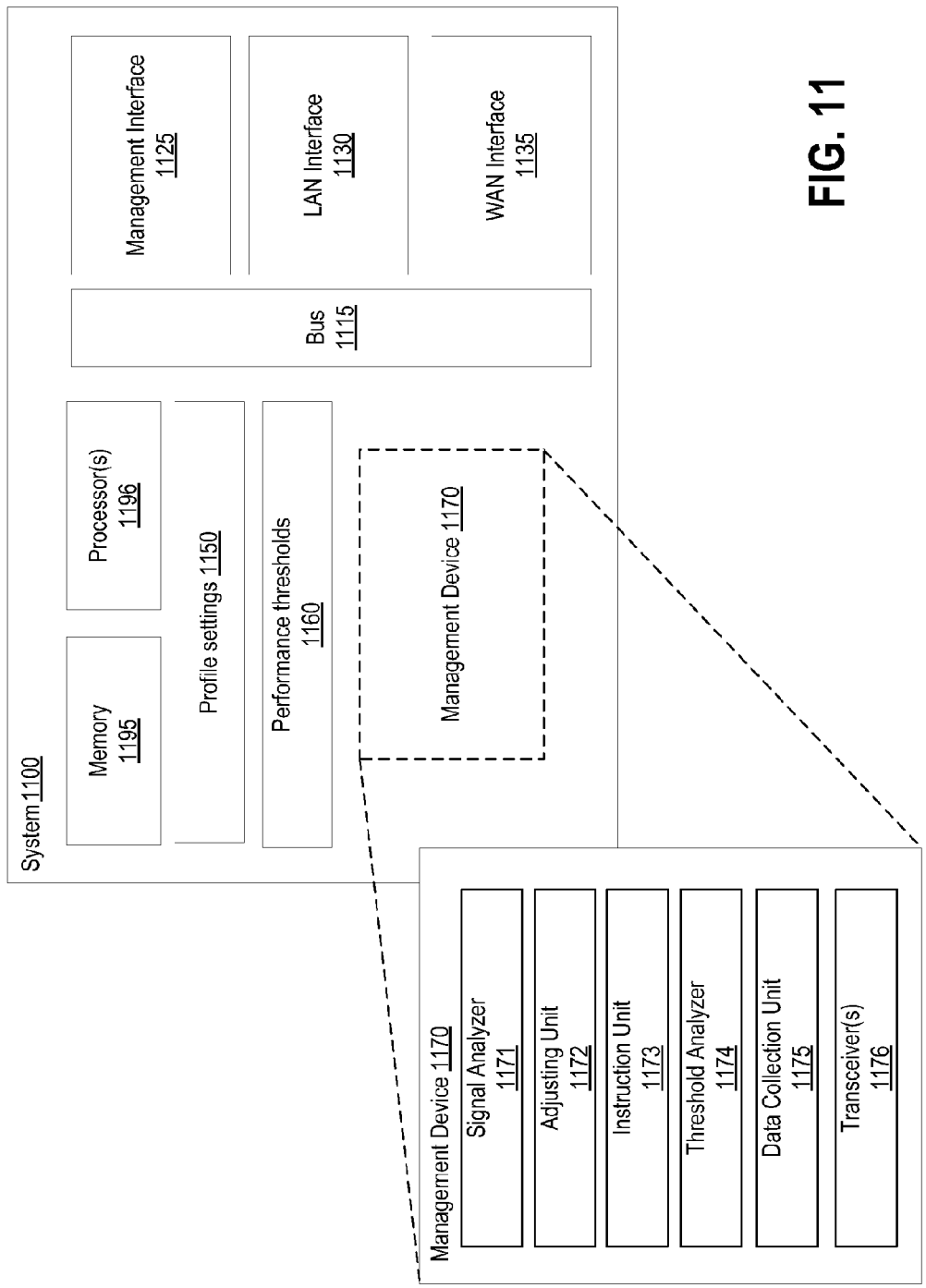
FIG. 11 shows a diagrammatic representation of a system in accordance with which embodiments may operate, be installed, integrated, or configured.

FIG. 11 shows a diagrammatic representation of a system 1100 in accordance with which embodiments may operate, be installed, integrated, or configured.

In one embodiment, system 1100 includes a memory 1195 and a processor or processors 1196. For example, memory 1195 may store instructions to be executed and processor(s) 1196 may execute such instructions. Processor(s) 1196 may also implement or execute implementing logic capable to implement the methodologies discussed herein. System 1100 includes communication bus(es) 1115 to transfer transactions, instructions, requests, and data within system 1100 among a plurality of peripheral devices communicably interfaced with one or more communication buses 1115. System 1100 further includes management interface 1125, for example, to receive requests, return responses, and otherwise interface with network elements located separately from system 1100.

In some embodiments, management interface 1125 communicates information via an in-band or an out-of-band connection separate from LAN and/or WAN based communications. The "in-band" communications are communications that traverse the same communication means as payload data (e.g., content) being exchanged between networked devices and the "out-of-band" communications are communications that traverse an isolated communication means, separate from the mechanism for communicating the payload data. An out-of-band connection may serve as a redundant or backup interface over which to communicate control data and instructions between the system 1100 other networked devices or between the system 1100 and a third party service provider. System 1100 includes LAN interface 1130 and WAN interface 1135 to communicate information via LAN and WAN based connections respectively. System 1100 includes performance thresholds 1160 upon which compliance with performance targets may be determined Profiles and profile settings 1150 are stored and provided to management device 1170 which adjusts settings of communicatively interfaced DSL lines. Historical information may also be stored and analyzed or referenced when conducting long term analysis and reporting.

Distinct within system 1100 is management device 1170 which includes signal analyzer 1171, adjusting unit 1172, instruction unit 1173, threshold analyzer 1174, data collection unit 1175, and one or more transceivers 1176. Management device 1170 may be installed and configured in a compatible system 1100 as is depicted by FIG. 11, or embodied in various forms such as a controller or a chip set for DSL network elements.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
adjusting a plurality of times a transmit power to vary between a first setting and a second setting on a first Digital Subscriber Line (DSL line) to optimize energy consumption for the first DSL line;
measuring or estimating a change in a performance of a second DSL line neighboring the first DSL line caused by a change in crosstalk on the second DSL line generated by the first DSL line in response to adjusting the transmit power of the first DSL line; and
identifying one or more DSL lines among a plurality of DSL lines determined to safely operate in a low-power mode by identifying which of the plurality of DSL lines exhibit a crosstalk coupling to neighboring DSL lines below a specified threshold.

2. The method of claim 1, further comprising:
transitioning at least one of the one or more DSL lines determined to safely operate in the low-power mode from full-power operation to a reduced power operation.

3. The method of claim 1, further comprising categorizing a level of the change in the performance of the second DSL line neighboring the first DSL line caused by the change in crosstalk.

4. The method of claim 3, wherein the change in crosstalk is associated with time-varying crosstalk emanating from the first DSL line due to a transition to a different transmit power level for the first DSL line.

5. The method of claim 4, wherein the transition to the different transmit power level comprises a transmission between one of the following transmit levels:
power state L0 representing full-power operation;
power state L2 representing a low-power operational mode supporting low-rate data transmission; or
power state L3 representing a state in which nothing is transmitted on the first DSL line.

6. The method of claim 5: wherein the power state L2 comprises multiple sub-L2 power states, each having a distinct power level; and
wherein the method further comprises transitioning between one of the power state L0, the power state L3, and one of the multiple sub-L2 power states corresponding to the power state L2.

7. The method of claim 3, wherein measuring the change in the performance of the second DSL line neighboring the first DSL line comprises measuring the change in accordance with one of the second DSL line's:
loss of margin;
resynchronizations;
error counts;
Seamless Rate Adaptation (SRA) to lower speeds;
data rate data;
Signal-to-Noise Ratio ("SNR") margin data;
maximum attainable data rate data;
aggregate transmitted power data;
code violation count data;
forward error correction data;
errored seconds data;
severely errored seconds data;
loss of margin data;
loss of signal data;
loss of framing data;
high bit error rate data;
TPS-TC out-of-sync data;
retrain counts data;
channel attenuation data;
noise power spectral density data;
crosstalk coupling data;
far-end crosstalk coupling data; or
data pertaining to crosstalk between a first DSL modem pair coupled with the DSL line and a second DSL modem pair operating on the second DSL line neighboring the first DSL line.

8. The method of claim 1, further comprising:
permitting abrupt transition to different transmit power levels for the one or more DSL lines determined to safely operate in the low-power mode.

9. The method of claim 8, wherein measuring the change in the performance of the second DSL line neighboring the first DSL line comprises:
measuring time-varying interference associated with the one or more DSL lines permitted to abruptly transition to transmit power levels against a specified threshold for risk to stability of neighboring DSL lines.

10. The method of claim 9, wherein the specified threshold for risk to stability of neighboring DSL lines comprises a number of retrains in a given period of time for the neighboring DSL lines.

11. The method of claim 9, further comprising:
terminating permission to abruptly transition to different transmit power levels for any of the one or more DSL lines having a measured time-varying interference risk above the specified threshold.

12. The method of claim 1, further comprising:
preventing the first DSL line from being further adjusted when the measured change in the performance of the second DSL line neighboring the first DSL line meets or exceeds a threshold; and
allowing the first DSL line to be further adjusted when the measured change in the performance of the second DSL line neighboring the first DSL line does not meet or exceed the threshold.

13. The method of claim 1, further comprising:
determining the first DSL line or the second DSL line exhibits a time-varying interference risk above a first threshold and below a second threshold and responsively implementing waiting periods for the respective DSL line to wait before entering and exiting low-power modes.

14. The method of claim 13, wherein the waiting periods mitigate time-varying interference risk onto other DSL lines to statistically controlled levels and increase stability for the other DSL lines.

15. The method of claim 1, further comprising:
determining if the first DSL line or the second DSL line exhibits a time-varying interference risk above a threshold and responsively increasing a power level of a low-power state to mitigate the time-varying interference risk onto other DSL lines and increase stability for the other DSL lines.

16. The method of claim 1, further comprising:
determining if the first DSL line or the second DSL line exhibits a time-varying interference risk below a threshold and responsively decreasing a power level of a low-power state to lower energy consumption while ensuring an acceptable interference risk onto other DSL lines.

17. The method of claim 1, further comprising:
predicting a further change in the performance of the second DSL line neighboring the first DSL line from further adjusting the transmit power for the first DSL line, the further change in the performance of the second DSL correlating to a further change in crosstalk on the second DSL line generated by the first DSL line in response to adjusting the transmit power of the first DSL line.

18. The method of claim 1, wherein measuring the change in the performance of the second DSL line neighboring the first DSL line comprises:
reading crosstalk data; and
calculating which of the plurality of DSL lines are predicted to cause excessive impact from time varying crosstalk using low-power states.

19. The method of claim 1, further comprising:
observing traffic patterns on the plurality of DSL lines; and
issuing recommendations for a choice of low-power mode parameters based on the traffic patterns observed to be implemented via adaptive re-profiling.

20. The method of claim 19, further comprising:
scheduling power-down and wake-up events for one or more of the plurality of DSL lines based on historical usage.

21. The method of claim 20, further comprising:
triggering a wake-up event during an Internet Protocol television (IPTV) set-top session initiation, or when a Voice over Internet Protocol (VoIP) device triggers an off hook event.

22. The method of claim 19, further comprising:
determining thresholds for each of the plurality of DSL lines transitioning to different power states based on the traffic patterns observed for the plurality of DSL lines.

23. The method of claim 22, further comprising:
resetting the determined thresholds for each of the plurality of DSL lines based on the traffic patterns observed for the plurality of DSL lines.

24. The method of claim 1, further comprising:
informing a DSL power management system that sessions are due to start or expire; and
rescheduling one or more power state transitions responsively.

25. The method of claim 1:
wherein the first DSL line and the second DSL line each participate within a common vectored group; and
wherein the method further comprises managing power state transitions of DSL lines in the vectored group to ensure stability for lines external to the vectored group.

26. The method of claim 25, further comprising either or both of operations comprising:
limiting performance of the lines external to the vectored group lines external to the vectored group to a level compatible with a time-varying crosstalk emanating from the vectored group; and
limiting a number or severity of power mode transitions for lines within the vectored group.

27. The method of claim 1, wherein transitions between different power states and power modes are implemented within transceivers of a DSL communication apparatus.

28. The method of claim 27, wherein the transitions between different power states and power modes are triggered based on traffic or performance parameters being measured above or below a threshold controlled by a DSL Management Information Base (MIB).

29. The method of claim 28, wherein a management device separate from the DSL MIB:
determines thresholds for each of a plurality of communicatively interfaced DSL lines; and
sets the thresholds via the DSL MIB to affect operation on each of the plurality of communicatively interfaced DSL lines without requiring the management device to maintain real-time traffic monitoring for each of the plurality of DSL lines.

30. A non-transitory computer readable storage medium having instructions stored thereon that, when executed by a processor of an apparatus, the instructions cause the apparatus to perform operations comprising:
adjusting a transmit spectrum of a first Digital Subscriber Line (DSL line) to optimize energy consumption on the first DSL line; and
changing settings for the first DSL line responsive to adjusting the transmit spectrum on the first DSL line until performance of the first DSL line at least meets a threshold performance by:
measuring a change in a performance of a second DSL line neighboring the first DSL line, wherein the change in performance is caused by a change in crosstalk received by the second DSL line generated by the first DSL line responsive to adjusting the transmit spectrum of the first DSL line.

31. A system comprising:
a processor and a memory;
one or more transceivers to receive DSL signals from a plurality of Digital Subscriber Lines (DSL Lines) communicatively interfaced to the system;
a transmit spectra adjustment circuitry to adjust a transmit spectra of a first Digital Subscriber Line (DSL line) to optimize energy consumption on the first DSL line;
an instruction unit to issue instructions to change settings for the first DSL line responsive to adjusting the transmit spectra on the first DSL line until performance of the first DSL line at least meets a threshold performance; and
wherein the instructions cause a management device to measure a change in a performance of a second DSL line neighboring the first DSL line, wherein the change in performance is caused by a change in crosstalk received by the second DSL line generated by the first DSL line responsive to adjusting the transmit spectra of the first DSL line.

32. Non-transitory machine readable storage media having machine executable instructions stored thereon that when executed cause a machine to perform a method comprising:
   adjusting a plurality of times a transmit power to vary between a first setting and a second setting on a first Digital Subscriber Line (DSL line) to optimize energy consumption for the first DSL line;
   measuring or estimating a change in a performance of a second DSL line neighboring the first DSL line caused by a change in crosstalk on the second DSL line generated by the first DSL line in response to adjusting the transmit power of the first DSL line; and
   identifying one or more DSL lines among a plurality of DSL lines determined to safely operate in a low-power mode by identifying which of the plurality of DSL lines exhibit a crosstalk coupling to neighboring DSL lines below a specified threshold.

33. The non-transitory machine readable storage media of claim 32, having further instructions that when executed cause the machine to perform a method comprising:
   transitioning at least one of the one or more DSL lines determined to safely operate in the low-power mode from full-power operation to a reduced power operation.

34. The non-transitory machine readable storage media of claim 32, having further instructions that when executed cause the machine to perform a method comprising:
   categorizing a level of the change in the performance of the second DSL line neighboring the first DSL line caused by the change in crosstalk.

35. The non-transitory machine readable storage media of claim 32, wherein the change in crosstalk is associated with time-varying crosstalk emanating from the first DSL line due to a transition to a different transmit power level for the first DSL line.

36. The non-transitory machine readable storage media of claim 35, wherein the transition to the different transmit power level comprises a transmission between one of the following transmit levels:
   power state L0 representing full-power operation;
   power state L2 representing a low-power operational mode supporting low-rate data transmission; or
   power state L3 representing a state in which nothing is transmitted on the first DSL line.

37. The non-transitory machine readable storage media of claim 36, wherein the power state L2 comprises multiple sub-L2 power states, at least one having a distinct power level.

38. The non-transitory machine readable storage media of claim 37, having further instructions that when executed cause the machine to perform a method comprising: transitioning between one of the power state L0, the power state L3, and one of the multiple sub-L2 power states corresponding to the power state L2.

39. An apparatus comprising:
   means for adjusting a plurality of times a transmit power to vary between a first setting and a second setting on a first Digital Subscriber Line (DSL line) to optimize energy consumption for the first DSL line;
   means for measuring or estimating a change in a performance of a second DSL line neighboring the first DSL line caused by a change in crosstalk on the second DSL line generated by the first DSL line in response to adjusting the transmit power of the first DSL line; and
   means for identifying one or more DSL lines among a plurality of DSL lines determined to safely operate in a low-power mode by identifying which of the plurality of DSL lines exhibit a crosstalk coupling to neighboring DSL lines below a specified threshold.

40. The apparatus of claim 36, further comprising: means for transitioning at least one of the one or more DSL lines determined to safely operate in the low-power mode from full-power operation to a reduced power operation.

* * * * *